Sept. 12, 1933. C. R. NICHOLS ET AL 1,926,212
ELECTRICAL PROSPECTING
Filed Aug. 16, 1926 2 Sheets-Sheet 1
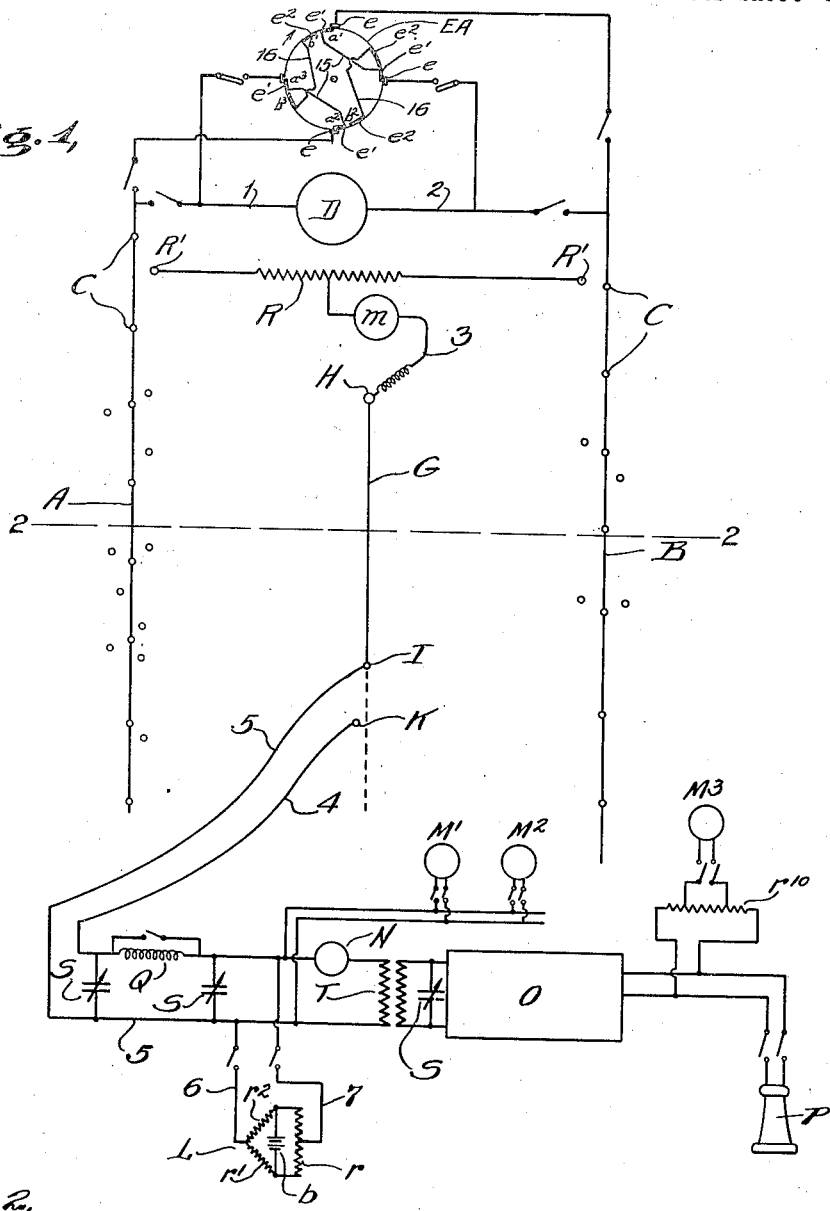
Fig. 1,
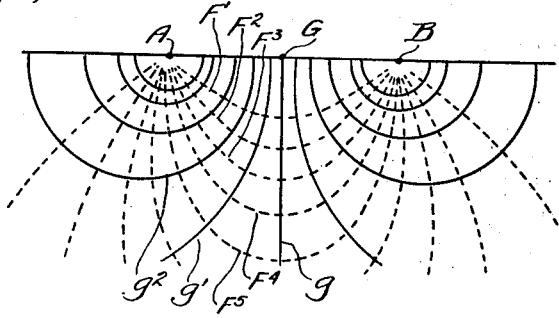
Fig. 2,
INVENTORS
CHARLES R. NICHOLS
SAMUEL H. WILLISTON
BY
John E. Hubbell
ATTORNEY Sept. 12, 1933.  C. R. NICHOLS ET AL  1,926,212
ELECTRICAL PROSPECTING
Filed Aug. 16, 1926   2 Sheets-Sheet 2

INVENTORS
CHARLES R. NICHOLS
and SAMUEL H. WILLISTON
BY John E. Hubbell
ATTORNEY Patented Sept. 12, 1933

1,926,212

UNITED STATES PATENT OFFICE 1,926,212

ELECTRICAL PROSPECTING

Charles Rodney Nichols and Samuel Hathaway Williston, Dallas, Tex.

Application August 16, 1926. Serial No. 129,430

4 Claims. (Cl. 175—182)

The general object of our present invention is to provide improved methods of and apparatus for determining the location and character of subsurface bodies or earth portions of different electrical resistance from adjacent earth portions. Our present invention is concerned primarily with the location of deposits of petroleum oil which in general gives either directly or indirectly to the sands or earth material impregnated by the oil or with which it is associated a resistance value differing from that of the adjacent rocks, water impregnated sands or other earth material, but many of the principles of our present invention are useful also in locating subterranean ore deposits of higher conductivity than the surrounding earth.

In carrying out our invention we create an electrical potential difference between suitably displaced portions of the field to be explored. The portions between which a potential difference is thus created are ordinarily located at the surface of the earth, but they may be located substantially beneath the general surface of the earth when natural or artificially formed openings or depressions in the surface of the field to be explored permit. We then proceed to determine the conducting characteristics of different portions of the earth through which an electric current flow is set up by the difference of potential created.

The general mode of procedure hereinbefore referred to has been previously suggested by others who have worked out many of the laws relating to the distribution of current flow between separated portions of the earth subjected to different electrical potentials and have devised methods for determining from measurments dependent on said distribution of flow the location of ore and other relatively good conducting bodies. According to our information and belief, however, the methods heretofore developed have not been well adapted for successful use in locating oil bearing sands, and are either not capable of successful practical use in locating conducting or non-conducting bodies at distances below the surface of the earth as great as those at which workable bodies of oil impregnated sands are commonly found, or are extremely complicated and cumbersome when adapted to exploration at great depths.

Our invention is characterized by various features of method and apparatus suitable for use in effectively determining differences in electrical resistance of bodies located at distances below the surface of the earth too great to permit their effective determination by methods of electrical prospecting heretofore suggested. Our invention also comprises improvements facilitating the relatively rapid, inexpensive, systematic and accurate exploration of relatively large areas including provisions facilitating the proper co-ordination, comparison and interpretation of a multiplicity of different readings taken at different times and places. Among the important specific features of our invention are provisions for eliminating, or compensating for the effects of stray earth currents, and facilitating the relatively rapid and inexpensive exploration of fields of comparatively great territorial expanse.

Some features of our present invention are concerned primarily with the direct location of bodies of oil or ore bodies, while others are concerned with the determination of sub-surface geological structure useful in indirectly locating oil containing masses and ore bodies, and our invention comprises improvements in the arrangement of earth contacts of especial value in determining the geological structural (strike and dip) characteristics.

The various features of novelty which characterize our invention are pointed out with particularity in the claims annexed to and forming a part of this specification. For a better understanding of our invention, however, its advantages and specific objects attained with it, reference should be had to the accompanying drawings and descriptive matter in which we have illustrated and described improved embodiments of our invention.

Of the drawings:

Fig. 1 is a diagrammatic representation of a portion of the earth's surface and means of electrical exploration of the subjacent earth;

Fig. 2 is a section on the line 2—2 of Fig. 1 illustrating the distribution of current flow in a vertical plane including separated portions of the surface of the earth between which a potential difference is maintained;

Figure 3:
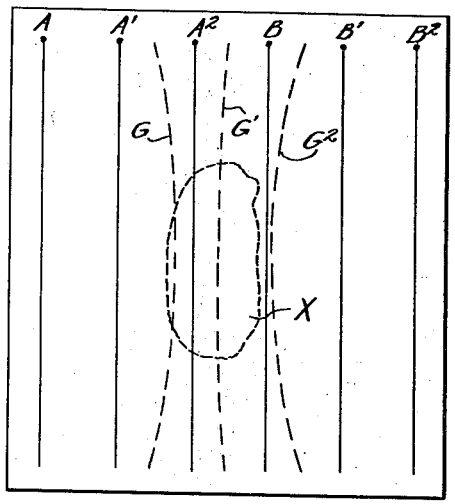
Fig. 3 is a map view of the surface shown in Fig. 1 illustrating exploration methods and results.

In one mode of procedure in accordance with the present invention, we create a potential difference along parallel linear portions of the earth surface indicated in Figs. 1 and 2, by the lines A and B, as by connecting one terminal 1 of a generator D to a plurality of metallic rods C inserted in the ground at intervals along the line A, and by connecting the other terminal 2 of the generator to a similar set of rods C inserted in the ground along the line B. With linear earth contacts arranged and energized as described the electrical current flow through the earth if the latter were homogeneous or of uniform conductivity, in a plane transverse to the lines A and B and intersecting the latter at points not too close to their ends, will be along curved lines, some of which are indicated in Fig. 2 by the concave lines $F'$, $F^2$, $F^3$, etc. The concavity of these curved lines of flow, and the distances between the lines A and B measured along them will increase with the vertical distance between the earth surface and the line of intersection of the curved conducting line with the diametral plane $g$ of the earth midway between the lines A and B. Theoretically the path of flow for the current passing between the lines A and B would include the entire earth, but in practice the amount of current flow along paths of flow which intersect the plane $g$ at great distances from the earth are too minute to be measurable. Indeed, it is mathematically demonstratable that with such an arrangement as is shown in Figs. 1 and 2, half of the total current flow between a unit of length of the line A and an opposing unit of length of the line B not close to the ends of the lines, will take place through the portion of the earth on the concave side of flow surface line $F^4$ which intersects the plane $g$ at a distance below the surface of the earth equal to approximately $\frac{8}{10}$ the distance between the lines A and B.

In a preferred mode of exploring an extended field for the direct location of bodies differing in resistance from the general earth resistance we plot on a map of the field to be explored one or more series of lines which we call homo-isopotential lines. A preferred mode of accomplishing this consists in first defining a pair of lines A and B by inserting the proper contacts C in the earth, then creating the desired potential difference between the lines A and B, and then determining the line on the earth surface between which and the lines A and B certain definite potential differences exist. In many cases the iso-potential line which we prefer to thus determine is the median iso-potential line G between which and each of the lines A and B the potential difference is half the potential difference between the lines A and B. This median iso-potential line will correspond with the line of intersection of the plane $g$ with the earth surface when the earth beneath the portion of the earth surface lying between the lines A and B is homogeneous, but will be laterally displaced and usually bent rather than straight, if the portion of the earth within the effective fields of exploration contains a body differing in resistance from the general earth structure.

An iso-potential line may be determined by measuring the potential difference in one or another of various ways between either line A and B and an exploring contact or contacts brought into contact with the earth at various points until by the potential differences measured, sufficient points along the iso-potential line G have been located. In a simple mode of locating the line G illustrated in Fig. 1, a potentiometer resistance R is connected to contacts at two points near to and bearing a certain definite relation to the two linear contacts A and B. Each end of the resistance R may advantageously be connected to one or more non-polarizable earth contacts R' in contact with the earth at or within fifty or one hundred feet or so of the corresponding line A or B, and the middle point in the resistance R is connected by a circuit conductor 3 including a milli-volt meter or other instrument $m$ for measuring small current flows, to an exploring contact H.

With the arrangement described, when the contact H is in contact with the earth at a point on the line G, no portion of the current flowing between the generator D and the contact C will pass through the instrument $m$, whereas if the contact H engages the earth at a point laterally displaced from the line G, current will flow through the instrument $m$ in one direction or the other. Having determined the line G for the initial location of the lines A and B, the contacts C defining the latter are moved to new locations to define new lines A' and B' parallel to the lines A and B and separated from one another by the same distance as the lines A and B, and the corresponding median iso-potential line G' is determined. These operations are repeated and the results are recorded preferably in most cases by plotting them on a map of the field explored. Such a map is shown in Fig. 3 wherein the lines A and B, A' and B', $A^2$ and $B^2$, etc., represent the positions of lines between which the determined potential difference is created, and the lines G, G', etc., represent the corresponding median iso-potential line.

We call lines located as are the lines G, G', and $G^2$ homo-iso-potential lines because they are determined in the same manner, and with the same relative potential difference between each such line and each of the corresponding pair of energized lines A and B, A' and B', or $A^2$ and $B^2$, etc., and with each simultaneously energized pair of such lines A and B, A' and B', etc., separated by the same distance and in parallelism with one another. By proceeding in this manner, a field of considerable extent may be explored with relative rapidity and in an accurate systematic manner, and the results obtained with the different settings of the energized lines may be coordinated and compared with, and interpreted by the results with the other locations of the energized lines.

The presence of a mass or body X of high resistivity below the surface shown by the map of Fig. 3 within an effective range of depth will result in the distortion of the adjacent homo-iso-potential lines G, G' and $G^2$, as indicated in Fig. 3, as a result of the greater specific resistance of the body X, as compared with the specific resistance of the adjacent portions of the earth. This is readily understood when account is taken of the fact that such a body tends to crowd a greater portion of the total current flow between the lines A and B into the portion of the earth directly above the body than would pass through such portion if the earth were homogeneous. This concentration of current flow obviously results in a greater potential difference between points on a line on the earth's surface which is transverse to the lines A and B and directly above the body X, than would exist with the current distribution prevailing if the corresponding portions of the earth were of homogeneous character and resistance.

The changes in potential between any pair of points intermediate the lines A and B resulting from the presence of the body X beneath the surface extending between the lines A and B depends among other things on the depth of the body below the surface of the earth. This is utilized in approximating the depth of the body X below the earth's surface, in accordance with the present invention, by locating two or more sets of homo-iso-potential lines extending over the same exploration field which differ as a result of the fact that the lines energized in determining one set of homo-iso-potential lines are separated by a distance which is different from that separating the lines energized for the determination of each other set of homo-iso-potential lines. Thus in Fig. 4, we have shown a map in which the homo-iso-potential lines G, G', and $G^2$ are the same as the correspondingly designated lines in the map shown in Fig. 3, while the lines GA, GA', and $GA^2$ represent similar homo-iso-potential lines determined when the distance between the energized lines employed is considerably less than the distance between the energized lines employed in determining the lines G, G', and $G^2$.

Figure 4:
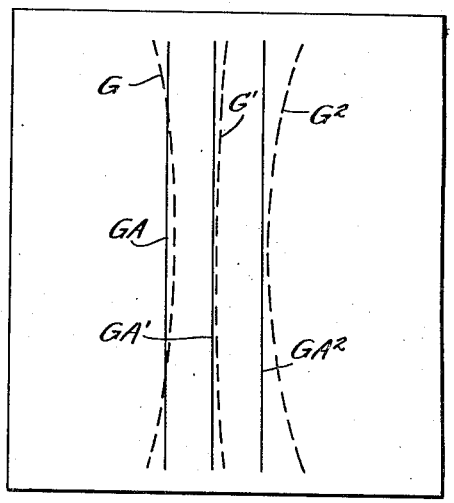
Fig. 4 is a map similar to that shown in Fig. 3 but including additional data.

In the map shown in Fig. 4, the homo-iso-potential lines GA, GA', $GA^2$, etc. are shown as practically undistorted, by the body X, whereas there is material distortion of the homo-iso-potential lines G, G', $G^2$, etc. From this it is easy to deduce that the depth of the body X below the surface of the earth is greater than it would be had it also materially distorted the iso-potential lines GA, GA', $GA^2$, etc. Thus it will be seen that there is a certain definite relationship between the relative disturbances of the two (or more) sets of homo-iso-potential lines and the depth of the body X. The calibration of this relationship between relative disturbances of several sets of homo-iso-potential lines and the depth of a disturbing body may be made empirically from observations over disturbing bodies whose depths are known. After such calibration is made and the general relation between such relative disturbances and depth of a disturbing body is charted it will then be possible to determine the depth of other disturbing bodies from a field determination of the above mentioned relative disturbances. Thus it will be seen that the homo-iso-potential chart method affords means of determining depth to, as well as location of bodies which differ in electrical conductivity from the surrounding earth material. While under certain conditions this calibration can be calculated mathematically, in actual practice so many unknowns are involved that the empirical calibration is the most practicable. Furthermore, some more or less close approximation to the vertical dimensions of the mass X may be obtained by locating still other homo-iso-potential lines by means of energized lines separated by a distance greater than that separating the lines A and B, A' and B', etc. employed in locating the lines G, G', $G^2$, etc.

As previously indicated the interpretation to be given to the distortion of any given set of homo-iso-potential lines depends upon a variety of factors including the geological structure and the relative conductivities of the mass X and adjacent portions of the earth, and all available information of such character should be utilized, of course, in interpreting the result obtained by methods of exploration disclosed and claimed herein. Regardless of these matters, however, the described method of exploring such a field resulting in such a map as that shown in Figs. 3 or 4, gives observation results which can be coordinated, compared and interpreted more readily and more accurately than the results obtained by any previous mode of electrical exploration known to us, and constitutes the first practical method of which we have knowledge capable of determining the approximate depth as well as the general outline of a mass of oil sand located at a considerable depth below the surface of the earth.

While, as already indicated, we consider it generally desirable whenever practically feasible, to determine and plot the median iso-potential lines, in many cases results can be secured by plotting some other iso-potential line, though for determinations at considerable depths it is in general essential to locate the median iso-potential line or the out cropping line of some iso-potential surface which, like the latter, extends deeply into the earth as does the iso-potential surface $g'$ shown in Fig. 2, for example, as distinguished from the iso-potential surfaces $g'$ and $g^2$ which extend into the earth only for comparatively small depths.

With the apparatus shown in Fig. 1, any desired iso-potential line may be located by shifting the connection of the conductor 3 to the resistance R away from the middle point of the latter or to some other suitable point. For instance, if the point of connection of the conductor 3 to the resistance R is such that four tenths of the potential drop in the resistance R will occur in the portion of that resistance between the point to which the line 3 is connected and the end of the resistance R connected to the contact R' adjacent the line A, the instrument m will show no current flow as a result of the energization of the lines A and B, only when the exploring contact H is at a point on the iso-potential line between which and the line A the potential difference existing is 40% of the potential difference between the contacts near the lines A and B. The advantage in some cases of using homo-iso-potential lines other than the median iso-potential lines arises from the fact that the potential drop between equally spaced apart points located on an earth surface line transverse to the lines A and B diminishes as the points are moved away from either line A and B toward the median iso-potential line. In other words, the minute electrical quantities which have to be observed in locating an iso-potential line increase as the relative potential difference between that line and the nearest energized line A or B decreases.

In lieu of locating the different points necessary for the determination of whatever iso-potential line is being located by shifting a single exploring contact H connected to the external energizing circuit in any such manner as the contact H is connected through the resistance R to the generator D in Fig. 1, it is, in practice, generally desirable to employ a pair of movable exploring contacts I and K which are connected into a suitable current measuring or indicating circuit and may be shifted over the surface of the earth. When two movable exploring contacts are thus employed, one, for example the contact I, may be progressively advanced along the iso-potential line being located progressively as points in that line are successively located, while the contact K is shifted to different points to thereby locate points along said iso-potential line not previously determined. The exploring contacts I and K may be constructed in a known manner to avoid polarization difficulties.

Since the electrical quantities to be determined in locating iso-potential lines are very minute, particularly when the energized lines A and B are widely separated as is necessary with the location of bodies far below the surface of the earth, or for the rapidly and relatively inexpensive exploration of a field of considerable surface area, amplification of these quantities is desirable. Methods of amplification which would suggest themselves as readily available if the lines A and B were energized with alternating current are not usable when those lines are energized from a source of direct current as we consider partically essential, in most cases at least, to avoid induction effects. We have devised a practically effective method of amplifying the current flow through a detector circuit which may be a measuring or indicating circuit suitable for use with a pair of exploring contacts I and K. This method involves the use of an interrupter, oscillator, or alternator N in the measuring or indicating circuit comprising conductors 4 and 5 by which the contacts I and K are connected to the primary of a transformer T. By employing an interrupter N adapted to break and re-establish the transformer primary circuit at an audio frequency of a thousand breaks per second or so, the current induced in the secondary of the transformer T may be amplified by means of one or more vacuum tube audio frequency amplifiers O such as is employed in an ordinary radio receiver system. In consequence, a telephone receiver P on which the amplified transformer secondary current is impressed will give a distinguishable tone indication as a result of a potential difference between the exploring electrodes I and K substantially more minute than could be detected if no amplifying provisions were employed.

In many cases, it is necessary to eliminate or compensate for stray earth currents due to the presence of electric railways or power transmission circuits in the vicinity, or to other and more obscure causes. When the stray currents are of high frequency they may be blocked out of such an indicating or measuring circuit as that to which the contacts I and K are shown as connected in Fig. 1, by the use of a choke coil Q in series with the exploring contacts, and one or two suitable variable capacity condensers S.

When the stray ground current is a direct current its disturbing effect may be eliminated or minimized in various ways. One such method of eliminating the effect of the earth current on the detector circuit to which the exploring contacts I and K are connected is illustrated in Fig. 1 and comprises means for impressing on the electrodes I and K a potential difference equal and opposite to the potential difference to which those contacts are subjected by the stray current. The means shown in Fig. 1 for accomplishing this result comprises a potentiometer L including a slide wire resistance $r$ connected at its ends to the terminals of a battery or other suitable source of current $b$ in shunt to which resistances $r'$ and $r^2$ are connected in series with one another. The junction point of the resistances $r'$ and $r^2$ are connected by a conductor 6 to the conductor 5, and a contact movable along the slide wire resistance $r$ is connected by a conductor 7 to the conductor 4. With this arrangement the movable contact engaging the slide wire resistance $r$ is adjusted until no measurable difference of potential exists between the contacts I and K during a period in which the lines A and B are de-energized.

In adjusting the potentiometer L shown in Fig. 1, a very sensitive meter M' and a less sensitime meter $M^2$ are adapted to be connected to the conductors 4 and 5 so that either may be used in measuring the current flow between the conductors I and K. In one mode of use contemplated, the initial adjustment of the potentiometer L is effected while the less sensitive meter $M^2$ is connected in circuit, and after the potentiometer is adjusted until the less sensitive meter $M^2$ shows no current flow, the more sensitive meter M' is put in circuit and the potentiometer is then further adjusted as may then be required until the sensitive meter M' shows no current flow, then the interrupter N is set into operation to make and break the previously open transformer primary circuit, and such further adjustment of the potentiometer is made as is necessary to entirely eliminate or reduce as far as is practically feasible and desirable the stray current flow indicated by the telephone P. By following the described procedure the sensitive meter M' and the amplifier O are protected against injury from excess current flow to which they might be subjected if the potentiometer were not given the preliminary adjustments before the sensitive meter and amplifying apparatus are connected to the circuit.

An alternative method of determining points on an iso-potential line which may be carried out with apparatus shown in Fig. 1, and which eliminates the necessity for balancing out stray ground currents, involves the use of a suitable sensitive meter or galvanometer $M^3$, and provisions for reversing the connections between the generator D and the electrodes C so as to reverse the polarity of the energized lines A and B at intervals. In general, the minute direct current due to the difference in potential of the electrodes I and K must be converted into a pulsating, oscillating, or alternating current, and the converted current must be suitably amplified before impressing it on the meter $M^3$. As shown in Fig. 1, the meter $M^3$ is connected to the same terminals of the same interrupting and amplifying mechanism as supply current to the telephone receiver P with the arrangement first described.

With the meter $M^3$ thus connected in circuit when the contacts I and K are not on the same iso-potential line, the potential difference between those contacts will depend both on the stray earth currents and on the current flow due to the generator D. Whether the potential difference between the contacts I and K due to the stray earth currents will add to or oppose the potential difference due to the generator D will depend upon the manner in which the generator is connected to the contacts C defining the energized lines A and B. The effect of reversing the generator connections will thus change the deflection of the meter $M^3$. By reversing the generator connections as the exploring contact K is being moved about over the field of exploration, the movement of the contact I onto the iso-potential line is made manifest by the fact that the reversal of the generator connections does not then change the deflection of the meter M³. Advantageously, a potentiometer $r^{10}$ is employed to vary the portion of the amplified current supplied to the meter M³ as required to give deflections to the meter pointer of convenient magnitude, and in particular to prevent the pointer of the instrument from being thrown off the scale.

Figure 5:
Fig. 5 is a diagrammatic representation of a modification of a portion of the apparatus shown in Fig. 1.
Figure 6:
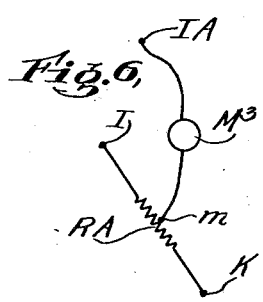
Figs. 6 and 7 are views taken similarly to Fig. 5 illustrating alternative connections of the parts shown in Fig. 5.
Figure 7:
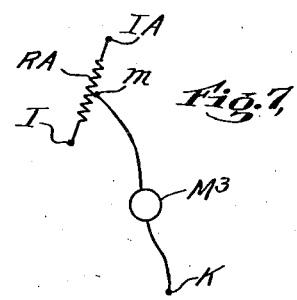

Another method of segregating stray earth currents from the current due to the generator is indicated diagrammatically in Figs. 5, 6, and 7. In this method we employ two contacts I and IA placed at separate points previously determined on the iso-potential line being located. In association with the contacts I and IA and exploring contact K we employ an adjustable resistance RA and a detector shown as a sensitive galvanometer M³, though in connection with such a detector we may well employ an interrupter N and amplifier O of the types previously described.

The method illustrated in Figs. 5, 6 and 7 depends upon the fact that a disturbing stray earth current will give different stray earth current potentials to the contacts I, IA, and K. In consequence, if the resistance RA is connected between the two contacts having the highest and lowest potentials due to stray earth currents, then by connecting one terminal of the detector M³ to the third contact, and the second terminal of the detector to a contact $m$ adjustable along the resistance RA, by suitable adjustment of the contact $m$, a condition will be reached in which no current will flow through the detector M³ when there is no current flow through the earth from the generator D. With the contact $m$ thus adjusted, when the generator D is caused to set up a current flow through the earth, no relative change in the potentials of the contacts I and IA will occur, since they are both on the iso-potential line being located, but if the contact K is not on the iso-potential line, there will be a current flow through the detector M³. By repeatedly cutting the generator D into and out of service while moving the contact K over the field being explored, and adjusting the contact $m$ as required after each shift in position of the contact K, the movement of the latter onto the iso-potential line may be detected, for with the contact K on the iso-potential line, and the contact $m$ properly adjusted along the resistance RA, there will be no current flow through the detector M³ regardless of whether the generator D is or is not creating a current flow through the earth.

Fig. 5 represents the relative arrangement employed when the stray earth current potential of the contact I is greater than that of the contact IA and less than that of the contact I. Fig. 6 shows the arrangement used when the stray earth current potential of the contact IA is greater than that of the contact K and less than that of the contact I, while Fig. 7 shows the arrangement employed when the stray earth current potential of the contact K is greater than one and less than that of the other of the contacts I and IA. In practice, we ordinarily prefer to employ a triple pole, triple throw switch or other convenient switching mechanism for quickly shifting from one to another of the three arrangements shown in Figs. 5, 6 and 7, as is necessary to determine to which two of the three contacts the resistance RA should be connected.

Some of the principles of the present invention may be used in determining the sub-surface geological structure. In general, the electrical conductivity of the stratified masses of earth material is greater in the direction of the planes of stratification than in directions transverse thereto. In consequence it is possible in some cases to determine from surface potential measurements both the strike and dip of strata. The information thus obtained often forms an indirect method of locating or approximating location of oil impregnated sands or ore bodies.

Figure 8:
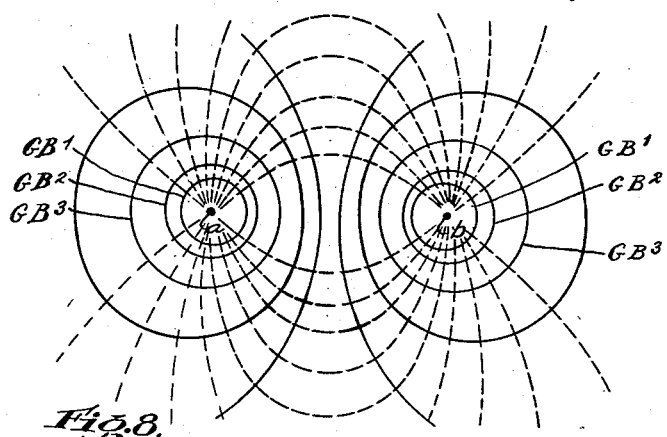
Fig. 8 is a diagram illustrating the formation of iso-potential lines about points on the earth's surface.

The previously described procedure resulting in the determination of such results as are indicated by the iso-potential lines G, G' and G² of Fig. 3, for example, involves the successive energization of regularly displaced sections of a field of exploration by creating a potential difference between spaced apart portions of each field section in energizing the latter and thereby producing a measurable effect when each section is energized. The effects thus successively produced by the successive energization of the different field sections are similar functions of the distribution of the earth current flows produced by the energization of the different sections of the field of exploration. In consequence, valuable information as to the resistance characteristics of the earth underlying the exploration field may be obtained by direct comparison of the measurements made in determining a single measurable effect for each field section energization. The reduction in the number of measurements required and the avoidance of any necessity for mathematical computations for converting the observational data into quantities which can be directly compared, constitute important practical advantages differentiating the systematic method of exploration hereinbefore described from the prior practices heretofore known to us. The effects measured in accordance with the present invention and their mode of production may vary with the conditions of use. For example, in determining geological structural conditions as well as in the direct location of oil sands and ore bodies, it is sometimes advantageous to successively create potential differences between earth surface points as distinguished from lines. When potential difference is created between points as $a$ and $b$ on the surface of a homogeneous portion of the earth the iso-potential lines GB', GB², GB³, etc. thereby created at the surface of the earth are in the form of closed curves surrounding the points $a$ and $b$ as shown in Fig. 8. If the points $a$ and $b$ are far apart the iso-potential lines G' close to each point will be almost but not quite circular, the radius of curvature being less at the side of the curve between the energized points than at the opposite side. The variations in the radius of curvature of a closed iso-potential curve increases as the average value of the radius increases. This follows inevitably from the fact that the radius of curvature at the point in the curve between each energized point can never exceed one half the distance between the points, while the radius of curvature on the opposite side may theoretically equal half the circumference of the earth. When the energized points lie above homogeneous earth the two halves of each curve on opposite sides of the line connecting the energized point are symmetrical but the presence of masses within the conducting field of different conductivity from the adjacent earth distort the iso-potential curve and from such distortion information can be obtained as to the character, shape, and location of such masses.

For the most effective use of closed iso-potential lines about energized points, a distinct advantage may be had by a method of procedure which will result in making the particular iso-potential curves located and utilized substantially circular.

Figure 10:
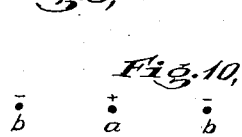
Figs. 10 and 11 are diagrams illustrating arrangements of point energizing contacts.
Figure 11:
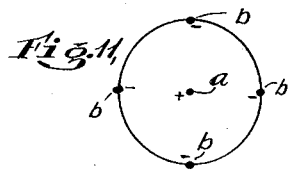

Distortion from the circular form of iso-potential lines surrounding one energized point may be diminished by creating a similar difference of potential between the first mentioned point and a plurality of other points symmetrically disposed at opposite sides of the first mentioned point. For example, an iso-potential line about a point $a$, as shown in Fig. 10, over homogeneous earth will approach more closely to the circular form if the same potential difference exists between the point $a$ and each of the two points $b$ at opposite sides of and equally distant from the point $a$, then would be had if one only of the energized points $b$ were employed. By increasing the number of points $b$ and symmetrically disposing them in a circle about the point $a$ as a center, as shown in Fig. 11, any desired degree of approach to a true circle may be given to any iso-potential line surrounding the point $a$ and appreciably closer to the latter than to the points $b$, provided, of course, that the underlying earth is of uniform resistance.

Figure 9:
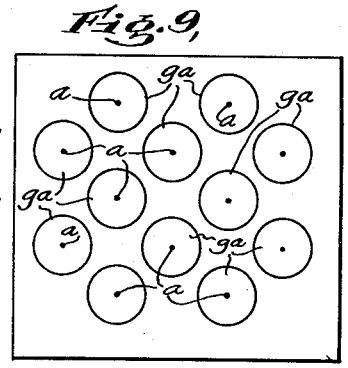
Fig. 9 is a map formed by plotting homo-isopotential lines located about regularly spaced points on a field of exploration.

In exploring the earth's surface by the use of energized points, the same general advantages are obtained from a systematic determination of similar current distribution functions such as similar iso-potential lines, as are obtained with the use of energized lines as distinguished from energized points. In Fig. 9 we show a map obtained by locating homo-iso-potential lines $ga$ about a multiplicity of successively energized points $a$ regularly located over the exploration field shown in the map. These iso-potential lines are shown in Fig. 9 as similar circles which they would closely approximate but would not actually become if the subjacent earth were homogeneous and the points $a$ were energized in a manner adapted to minimize variation in the radius of curvature of each homo-iso-potential line $ga$ formed.

In practice, the contacts C defining the lines A and B should be fairly numerous to reduce the contact resistance between the earth and the external circuit which utilizes a large portion of the potential furnished by the generator D or other sources of current. The distance between adjacent contacts C may increase with the lengths of the lines A and B and the distance between those lines. When the lines A and B are half a mile or so long and are spaced a half a mile or so apart, the distance between adjacent contacts C may well be twenty or thirty feet. When the lines A and B are separated by 5 or 6 miles, as they may well be in some cases, the contacts may well be 100 or 200 feet apart. It will be understood, of course, that it is not necessary to place the contacts defining either of the lines A and B exactly on the same geometrical line, and in some cases it may be advantageous to disperse the contacts C at regular intervals over a zone forty or fifty feet wide and the center line of which is then assumed to be line A or B. Increasing the voltage of the generator is obviously advantageous, as increasing the current flow through the earth tends to more positive readings and to minimize the disturbing effects of stray earth currents, and to increase the distance between the energized portions of the earth which will permit sufficiently positive observations to be made, and in practice we contemplate the use of a direct current generator such as a 250 volt dynamo with a normal load current of 50 amperes, though of course, the invention in its broader aspects does not depend on the voltage and current output of the dynamo employed.

The location of an iso-potential line is obviously facilitated if, when the exploring contact is placed on the earth at a point off the line being located, the meter $M^3$ or other detector instrument employed to indicate current flow indicates not merely the existence of current flow, but also the direction of current flow relative to the direction of current flow through the earth between the energized portions thereof. If the meter $M^3$ employed is a zero center meter, the pointer is deflected away from the center for one direction of flow through the meter winding, and is deflected in the opposite direction when the flow through the meter winding is reversed, so that the deflection obtained may indicate not merely that the exploring point must be shifted, but the direction in which it is to be shifted. In practice, however, as already indicated, it is frequently necessary to periodically reverse the polarity of the energized portions in order to neutralize or compensate for the effects of stray earth currents. To expedite observations, we have, therefore, found it advisable to use in many cases means for automatically reversing the polarity of the energized portions of the earth at regular intervals and in such a manner that the observer observing the instrument $m$ or equivalent device or contacts need not be in direct or signalling communication with an operator at the generator and controlling reversal of the latter. To this end, we have provided in Fig. 1 an automatic reversing mechanism E which periodically interchanges the connections between the generator terminals and the lines A and B in such manner that the direction of current flow in one direction, for example, that from the line A to the line B, occurs during periods of three seconds say, whereas the alternating periods during which the current flow is in the opposite direction from B to A are each of a different length, of say seven seconds. With the current flow reversed in the regular and predetermined manner described, the observer does not require to be in communication with the energizing station to tell the direction of current flow through the earth from the generator D at any instant and to determine with practical certainty whether sudden marked deflections of the instrument read by the observer are due to the reversal of current flow through the earth from the generator D or are due to some extraneous cause. In some cases also we find it advantageous to interrupt the energizing circuit at regular intervals and have deenergized periods of say fifteen or thirty seconds, as this facilitates the determination of stray earth currents and the steps necessary for their elimination, and the interrupter E shown in Fig. 1 is arranged to do this.

As diagrammatically shown in Fig. 1, the reversing mechanism E comprises a rotating body EA which in use is continuously rotated by a suitable timing mechanism (not shown) in order to move contacts $e'$ and $e^2$ into and out of engagement at regular intervals with a pair of diametrically opposed brushes $e$ connected one to one, and the other to the second of the terminals of the generator D, and into and out of engagement with another pair of diametrically opposed brushes e connected one to the conductor 1 and the other to the conductor 2. As shown there are four contacts $e'$ spaced at regular intervals around the periphery of the body EA. Two of the contacts $e'$ are connected each by the conductor 15 to the contact $e'$ 90° behind it. Back of each contact $e'$ is a contact $e^2$, and each of a diametrically opposed pair of contacts $e^2$ is connected to a contact $e^2$, 90° behind it by a conductor 16. By a suitable circumferential elongation of each of the contacts $e'$ and $e^2$, the durations of the periods of current flow in opposite direction, and of the periods of total cessation of current flow may be made whatever they are desired to be.

While in accordance with the provisions of the statutes we have illustrated and described the best forms of our invention now known to us it will be apparent to those skilled in the art that changes in the methods and apparatus specifically illustrated and described herein may be made without departing from the spirit of our invention as set forth in the appended claims, and that features of our invention may sometimes be used to advantage without a corresponding use of other features.

Having now described our invention, what we claim as new and desire to secure by Letters Patent, is:

1. In the electrical determination of the subsurface composition of the earth, the method which consists in successively creating a potential difference between different groups of earth surface portions regularly distributed over the field of exploration, and locating a similar iso-potential line for each group and plotting said lines on a map of said field.

2. In the electrical determination of the subsurface composition of the earth, the method which consists in energizing the earth's surface along spaced-apart parallel lines to create a potential difference between said lines, locating an iso-potential line at the surface of the earth between which and said energized lines predetermined relative potential differences exist, and repeating the operations described without change other than a measured lateral shift of the energized lines from their initial position to thereby locate a series of homo-iso-potential lines across the surface of the field to be explored.

3. In the electrical determination of the subsurface structure of the earth, the method which consists in creating a potential difference between different portions of the earth's surface alternating in directions and with the periods during which the potential difference is in one direction differing in magnitude from the periods during which the potential difference is in the opposite direction.

4. In the electrical determination of the subsurface structure of the earth, the method which consists in periodically creating a potential difference between different portions of the earth's surface alternately in opposite directions at regular intervals and maintaining each such difference during an observation period and at other regular intervals eliminating such potential difference during corresponding observative periods.

CHARLES RODNEY NICHOLS.
SAMUEL HATHAWAY WILLISTON.